United States Patent [19]

Fukahori et al.

[11] Patent Number: 4,872,737
[45] Date of Patent: Oct. 10, 1989

[54] MULTI-PORT FIBEROPTIC ROTARY JOINT

[75] Inventors: Toshio Fukahori; Hideyuki Takashima, both of Hitachi; Hitoshi Morinaga, Takahagi, all of Japan

[73] Assignee: Hitachi Cable Limited, Tokyo, Japan

[21] Appl. No.: 241,536

[22] Filed: Sep. 7, 1988

[51] Int. Cl.$^4$ ................................................ G02B 6/36
[52] U.S. Cl. .................................. 350/96.2; 350/96.18
[58] Field of Search ............... 350/96.15, 96.18, 96.2, 350/96.21, 445

[56] References Cited

U.S. PATENT DOCUMENTS 3,350,156  10/1967  Adams ................................ 350/445
4,671,613  6/1987   Buhrer .............................. 350/96.18
4,725,116  2/1988   Spencer et al. ..................... 350/96.2

FOREIGN PATENT DOCUMENTS 0111390  6/1984  European Pat. Off. .......... 350/96.15

Primary Examiner—John D. Lee
Assistant Examiner—John Ngo
Attorney, Agent, or Firm—Dykema Gossett

[57] ABSTRACT

A multi-port fiberoptic rotary joint comprising a trapezoid prism provided between a rotative member and a fixed member of the rotary joint so as to be rotatable relative to the rotative member and coaxial with said rotative member, a speed change gear mechanism for transmitting the rotation of the rotative member to the trapezoid prism so as to rotate the trapezoid prism at an angular velocity half the angular velocity of the rotative member, rhomboid prisms provided on the entrance side of the trapezoid prism so as to optically guide the light coming from a region outside an aperture of the trapezoid prism to the trapezoid prism as the light parallel to the axis of the trapezoid prism within the aperture thereof, and the rhomboid prisms provided on the exit side of the trapezoid prism so as to optically guide the light emanating from the trapezoid prism to a region outside the aperture of the trapezoid prism, a plurality of pairs of convergent lenses respectively provided to the rotative member and the fixed member, the convergent lenses of each pair optically facing each other via the rhomboid prisms, the trapezoid prism and the rhomboid prisms, and entrance and exit side optical fibers respectively connected to the entrance and exit surface side convergent lenses.

50 Claims, 4 Drawing Sheets

MULTI-PORT FIBEROPTIC ROTARY JOINT

BACKGROUND OF THE INVENTION

1. Field of the Invention

This invention relates to a multi-port fiberoptic rotary joint for optically coupling through a trapezoid prism a plurality of optical fibers mounted on a rotative member and a fixed member of the rotary joint.

2. Background Art

The prior art will be described below with reference to the accompanying drawings wherein the like reference numerals designate identical elements in different Figures.

FIG. 1 illustrates a prior multi-port fiberoptic rotary joint disclosed in Japanese Utility Model Application Laid Open No. 61-6818 (6818/1986). As illustrated in FIG. 1, inside a fixed member 1 there are provided a rotative member 2, a trapezoid prism (dove prism) 3, and a prism holder 4 rotatable relative to and coaxial with the rotative member 2. Emission side optical fibers 5a and 5b are coupled with the entrance surface of the trapezoid prism 3 through ferrules 6a and 6b, and rod-shaped collimating convergent lenses 9a and 9b, both mounted on the fixed member 1. Reception side optical fibers 14a and 14b are coupled with the exit surface 3c of the trapezoid prism 3 through ferrules 13a and 13b, and collimating convergent lenses 10a and 10b, both mounted on the rotative member 2. Speed change gears 40, 41, 42, and a speed change gear shaft 43 are disposed among the rotator 2, the prism holder 4, and the fixed member 1, which serve in combination as a speed change gear mechanism for reducing the angular velocity of the rotative member 2 to half and for transmitting it to the prism holder 4.

Light from the emission side optical fiber 5a is collimated through the convergent lens 9a, allowed to enter the entrance surface 3a of the trapezoid prism 3, refracted there, and entirely reflected at the bottom surface 3b of the prism 3. And further, it is refracted at the exit surface 3c, permitted to go out thereof, collimated through the convergent lens 10b, and permitted to enter the receiving side optical fiber 14b. Another emission side optical fiber 5b and the receiving side optical fiber 14a are also coupled with each other in the same fashion discribed above. In the optical rotary joint, as the rotator 2 rotates, the trapezoid prism 3 rotates at an angular velocity which is half of that of the rotator 2 in the same direction, thereby optically cancelling the rotation of the rotator 2. Hence, couplings between the entrance and exit side optical fibers 5a and 14b, and between the entrance and exit side optical fibers 5b and 14a are not deteriorated.

FIG. 2 illustrates another prior example of a multi-port rotary joint as disclosed in Japanese Utility Model Application No. 60-157843 (157843/1985). In the multi-port fiberoptic rotary joint of FIG. 2, an improvement of the one illustrated in FIG. 1, there are provided intermediate optical fibers 8 and convergent lenses 9 between the emission side optical fibers 5 and a trapezoid prism 3, and likewise in the rotator 2 side there are provided intermediate optical fibers 11 and convergent lenses 10 between the receiving side optical fibers 14 and the trapezoid prism 3. Speed change gears 23, 24, 25 and 26, and a gear shaft 27 are provided among the rotator 2, the prism holder 4 and the fixed member 1 in the same manner as in FIG. 1 as the speed change gear mechanism for reducing the angular velocity to half of that of the rotator 2 and transmitting the decelerated rotation to the prism holder 4. The multi-port fiberoptic rotary joint is further adapted to couple the light from the emission side to the receiving side by means of a connector mechanism (a receptacle 18 and a plug 15) for connecting the emission optical fiber 5 with the optical fiber 8 and of another connector mechanism (a receptacle 19 and a plug 46) for connecting the receiving optical fiber 14 with the optical fiber 10.

The trapezoid prism 3 forms an inverted mirror image between an incident light image and an emergent light image with respect to an optical axis as illustrated in FIG. 1 when the length of the trapezoied prism 3, l, satisfies, assuming its aperture to be S, a relation $l = 4.23 \times S$ (BK-7, borosilicate glass, is employed as prism material). The outer diameters of the optical connectors (receptacles 15, 16, etc.) typically range from 6 to 10 mm, and hence in a four-core optical rotary joint for example, the aperture $S_1 = 15$ to 20 mm and the length $l_1 = 63.5$ to 84.6 mm.

However, as illustrated in FIG. 3, coupling loss between the optical fibers is remarkably increased as the distance between the convergent lenses goes beyond 50 mm. With $l_1$ being between 63.5 mm and 84.6 mm, the coupling loss is increased to 3dB to 7dB. In addition, slight angular mismatching between the plugs 20a, 20b and the receptacles 15a, 15b causes a bundle of light to be expanded at the entrance surface 3a, bottom surface 3b, and exit surface 3c of the trapezoid prism 3 thereby deteriorating the rotation chracteristics of the multi-port rotary joint. In particular, the longer the length of the trapezoid prism 3, l, the more conspicuous the expansion of the bundle of light due to the angular mismatching. It is accordingly desirable to reduce the prism length l to the utmost.

To solve the aforementioned problem, a measure was taken as illustrated in FIG. 2, in which intermediate optical fibers 8 and 11 are interposed between the receptacles 18, 19 and the trapezoid prism 3 in order to improve the packaging density of the device. This however results in severe loss of the light when the intermediate optical fibers 8 and 11 are bent to an extreme, and requires a certain length because of the possibility of their being broken. For this, the total length $L_1$ of the rotary joint must be large although the length $l_2$ of the trapezoid prism 3 is reduced, making difficult their connection to a rotary part. Furthermore, the intermediate optical fibers 8 and 10 terminate at ferrules for connectors, whose ends therefore needs polishing, causing an increase in fabrication cost as well as an increase in the coupling loss because of the increase of connections by a factor of two.

SUMMARY OF THE INVENTION

To solve the problem of the prior art discussed above, it is an object of the present invention to provide a multi-port fiberoptic rotary joint capable of improving the aforementioned coupling loss as well as the rotation characteristics of a rotary joint by reducing the prism length.

Another object of the present invention is to provide a multi-port fiberoptic rotary joint capable of reducing not only the prism length but also the entire length of the rotary joint.

Still another object of the present invention is to provide a multi-port fiberoptic joint capable of being inexpensively fabricated with ease.

Yet another object of the present invention is to provide a multi-port fiberoptic rotary joint capable of avoiding the increase in the coupling loss due to moisture condensation by preventing the formation of dew on a prism in an optical rotary joint.

To achieve the above objects, a multi-port fiberoptic rotary joint according to the present invention comprises a trapezoid prism provided between a rotative member and a fixed member so as to be rotatable and coaxial with the rotative member; a speed change gear mechanism for transmitting the rotation of the rotative member to the trapezoid prism to drive the trapezoid prism at an angular velocity half that of the rotative member; reflectors respectively provided on the entrance surface side and the exit surface side of the trapezoid prism so as to reflect the light from a region outside an aperture of the trapezoid prism and guide the light to the trapezoid prism with the light in the aperture parallel to the longitudinal axis of the trapezoid prism, on the one hand and to reflect the light from the prism to a region outside the aperture of the prism, on the other hand; a plurality of pairs of convergent lenses, the convergent lenses of each pair respectively provided on the rotative member and the fixed member, and adapted to optically face each other via the entrance and exit surfaces of the trapezoid prism, the reflectors being located between each lens and the prism surface; and entrance and exit side optical fibers respectively coupled with the entrance and exit side convergent lenses.

In accordance with the optical rotary joint of the present invention, light emanating from the emission side optical fiber is collimated through the convergent lens located at a region outside the aperture of the trapezoid prism and reflected by the reflector to change its direction so as to be parallel to the axial direction of the trapezoid prism and enter the entrance surface of the trapezoid prism. The incident light changes its optical path by the trapezoid prism, which produces an inverted mirror image between an incident light image and an emergent light image with respect to an optical axis, so as to propagate in the axial direction of the trapezoid prism and emanate from the exit surface of the prism. The light emanating from the exit surface of the trapezoid prism is reflected by the reflector, and guided to the convergent lens disposed at the region outside the aperture of the trapezoid prism for coupling thereof with the receiving side optical fiber.

The trapezoid prism is rotated at an angular velocity which is half that of the rotative member, so that a rotating image on the rotator side is altered to a stationary one by the trapezoid prism and transmitted to the fixed member side. Conversely, the stationary image on the fixed member side is altered to a rotating image rotating at the same angular velocity as that of the rotator and transmitted to the rotator side. This enables a desirable coupling between the emission side optical fibers of the stationary member and receiving side optical fibers of the rotative member even when the rotative member rotates.

According to a first aspect of this invention, there is provided a multi-port fiberoptic rotary joint comprising a trapezoid prism provided between a rotative member and a fixed member so as to be rotatable relative to the rotative member and coaxial with the rotative member, a speed change gear mechanism for transmitting the rotation of the rotative member to the trapezoid prism so as to rotate the trapezoid prism at an angular velocity which is half that of the rotative member, exit and entrance side optical fibers respectively connected in the same number with the rotative member and the fixed member, a plurality of rhomboid prisms, each provided for each optical fiber, namely located between the entrance side optical fibers and the entrance surface of the trapezoid prism and between the exit side optical fibers and the exit surface of the trapezoid prism so as to reflect twice if necessary the light from the entrance side optical fibers so that the light may propagate through the aperture of the trapezoid prism in the axial direction of the trapezoid prism, and a plurality of pairs of convergent lenses, one of the convergent lenses of each pair provided for the rotative member and the other to the fixed member and two lenses of each pair adapted to optically face each other via the trapezoid prism with one reflector being between each fiber and the entrance and exit surfaces of the trapezoid prism, so as to couple the entrance side optical fibers with the fixed member as well as the exit side optical fibers with the rotative member.

According to a second aspect of the present invention, there is provided a multi-port fiberoptic rotary joint including a trapezoid prism provided between a rotative member and a fixed member so that it may be rotatable relative to the rotative member and coaxial with the rotatitve member, a speed change gear mechanism for transmitting the rotation of the rotative member to the trapezoid prism so that the trapezoid prism may rotate at an angular velocity of half compared with the rotative member, exit and entrance side optical fibers respectively connected in the same number with the rotative member and the fixed member, two truncated conical mirrors, one of which mirrors is provided between the entrance of the trapezoid prism and the entrance side optical fibers and the other between the exit surface of the trapezoid prism and the exit side optical fibers, so that the light emanating from the entrance side optical fibers may be reflected once to be directed into the aperture of the trapezoid prism being parallel to the axis of the prism, and a plurality of pairs of convergent lenses, one of the convergent lenses of each pair provided to the rotative member and the other to the fixed member and two of each pair adapted to optically face each other via the reflector, the trapezoid prism, and the reflector, so as to couple the entrance side optical fibers with the fixed member as well as coupling the exit side optical fibers with the rotative member.

These and other aspects, objects and advantages of the present invention will be more fully understood by reference to the following detailed description taken in conjunction with various figures and appended claims.

BRIEF DESCRIPTION OF THE DRAWINGS

The accompanying drawings form an integral part of the description of the preferred embodiments and are read in conjunction therewith. Like reference numerals designate identical components in the different Figures, where.

DESCRIPTION OF THE PREFERRED EMBODIMENTS

Figure 4:
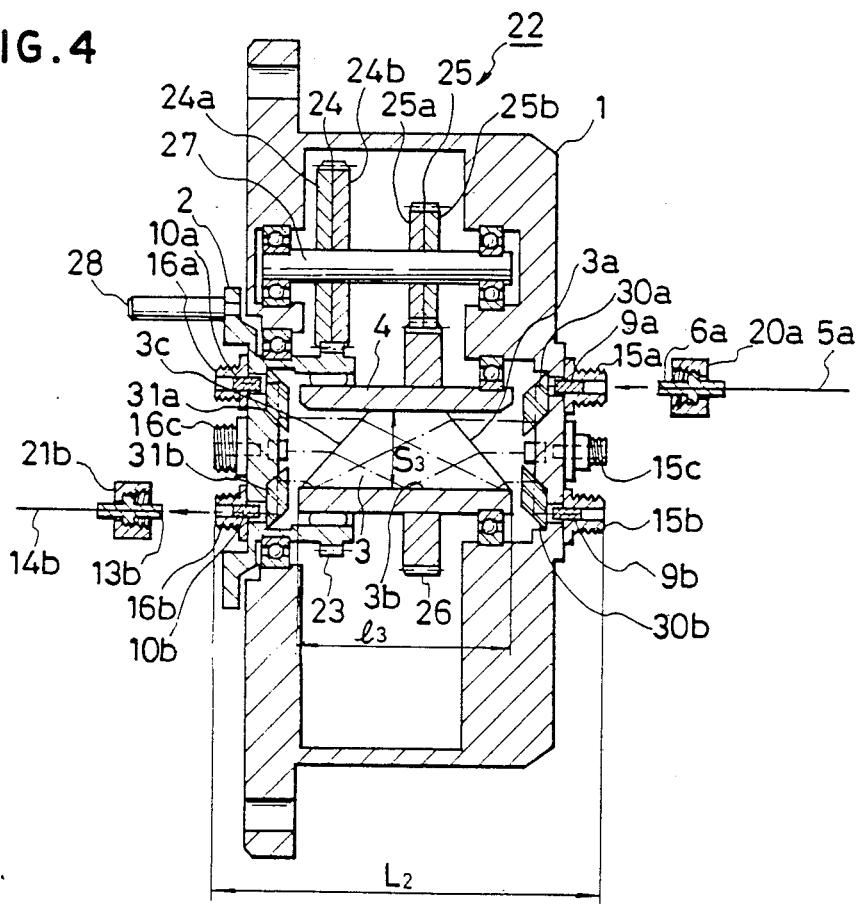
FIG. 4 is a longitudinal sectionl view illustrating an embodiment of a multi-port fiberoptic rotary joint according to the present invention.

As illustrated in FIG. 4, a fixed member 1 rotably supports a rotator 2 inserted partly therein. Inside the fixed member 1 a prism holder 4 is positioned to be coaxial with the rotator 2 so as to support a trapezoid prism 3. Ends of the prism holder 4 are supported respectively on the fixed member 1 and the rotator 2 via bearings. Convergent lenses 9a, 9b, 9c, etc., housed in receptacles 15a, 15b, 15c, etc., are disposed on an axis parallel to a prism optical axis to the entrance surface 3a side of the trapezoid prism 3. Rhomboid prisms 30a, 30b, 30c, etc., which serve as reflectors, are mounted on the fixed member 1 between the trapezoid prism 3 and the convergent lenses 9. The rhomboid prism 30 has both ends finished as totally reflective surfaces each with an angle of deflection of 90 degrees. Likewise, convergent lenses 10a, 10b, 10c, etc., housed in receptacles 16a, 16b, 16c, etc., are located on an axis parallel to the prism axis to the exit surface 3c side of the trapezoid prism 3, and rhomboid prisms 31a, 31b, 31c are mounted to the rotator 2 between the prism 3 and the convergent lenses 10. The convergent lenses 9 and 10 housed in the receptacles 15 and 16, and entrance and exit side optical fibers 5 and 14 having ferrules 6 and 13 of plugs 20 and 21 are optically coupled with each other by screwing the plugs 20 and 21 on the receptacles 15 and 16. A speed change gear mechanism 22 is provided inside the fixed member 1 around the prism holder 4 so as to decelerate the rotation of the rotator 2 to half (in the same direction) and transmit it to the prism holder 4. The speed change gear mechanism 22 mainly comprises a gear 23 attached around the rotator 2, a gear 24 attached onto a shaft 27 supported rotatably in the fixed member 1 and engaged with the gear 23, and a gear 25 provided on the shaft 27 and engaged with a gear 26 formed in the central outer periphery of the prism holder 4. The gears 24,25 as intermediate ones are divided respectively into gears 24a and 24b, and 25a and 25b so as to produce relative rotational displacement in the direction of rotation thereof, between which divided gears a resilient member such as a spring is provided for biasing those divided gears in a direction the displacement is to be produced. Here, designated at 28 is a rod for transmitting the rotative power of the rotary element (not shown) to the rotator 2 for optical transmission.

Light emanating from the outgoing side optical fiber 5a is collimated by the convergent lens 9a and allowed to enter the side face of the rhomboid prism 30a. The light entering the rhomboid prism 30a is entirely reflected at one end surface of the rhomboid prism 30a located at a position external of the aperture of the trapezoid prism 3 to alter its direction of propagation at right angle and advance along the axis of the rhomboid prism 30a (in the radial direction of the trapezoid prism 3). And thereafter, the light is totally reflected by 90 degrees at the other end of the trapezoid prism 30a located inward of the aperture of the same so as to enter an entrance surface 3a of the trapezoid prism 3 in a direction parallel to the axis of the trapezoid prism 3. The light through the entrance surface 3a is totally reflected at the bottom surface 3b, refracted at the exit surface 3c to proceed parallel to the optical axis of the trapezoid prism and reach the rhomboid prism 31b, and is totally reflected twice in the same manner as in the above description inside the same prism so as to propagate from the convergent lens 10b to the exit side optical fiber 14b. The description is also applicable to the other pairs of entrance and exit side optical fibers. When the rotator 2 is rotated at an angular velocity $\omega$, the prism holder 4 and the trapezoid prism 3 are driven for rotation in the same direction at an angular velocity of $(\frac{1}{2})\omega$ by the speed change gear mechanism 22. Hereby, an optical image on the rotator 2 side becomes stationary when viewed from the fixed member 1 side as disclosed in depth in Japanese Utility Model application Koukoku (second publication) No. 61-24961 (24961/1986). This accordingly assures proper connection between a plurality of pairs of the exit and entrance side optical fibers 5 and 14 irrespective of the rotation of the rotator 2.

Figure 1:
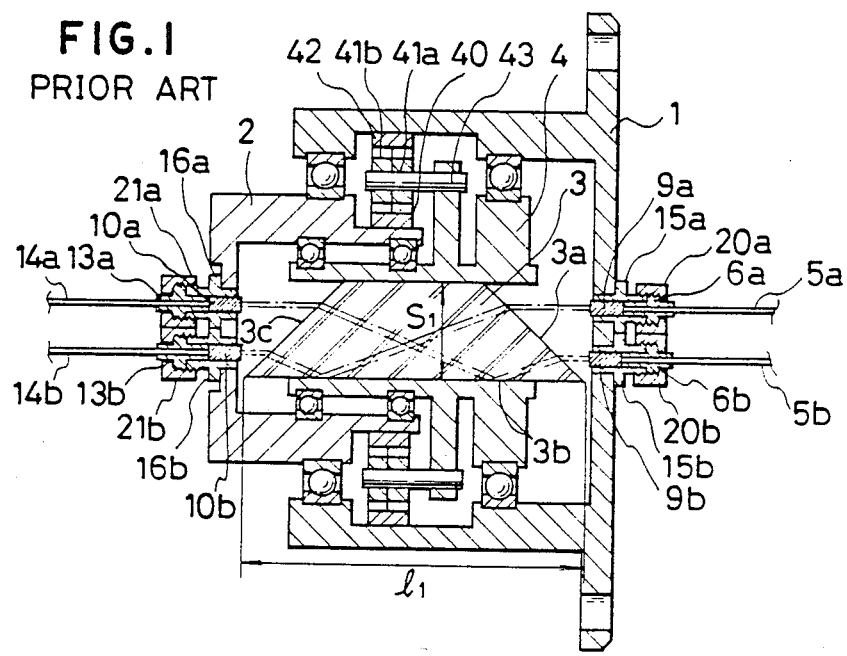
FIGS. 1 and 2 are longitudinal sectional views respectively illustrating prior multi-port fiberoptic rotary joints.
Figure 2:
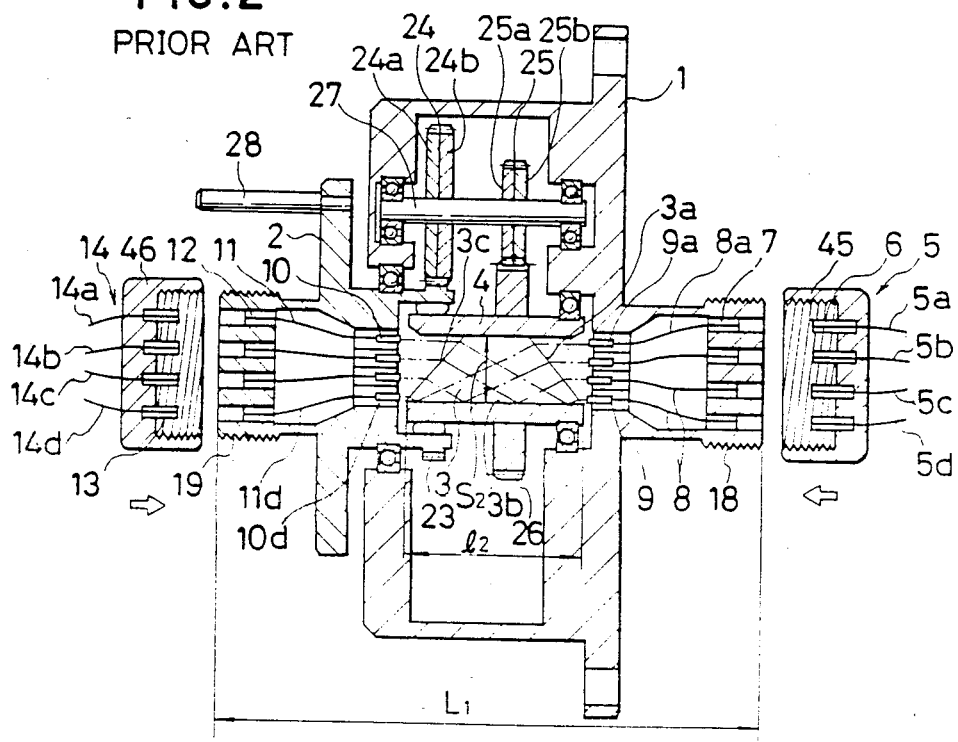
Figure 3:
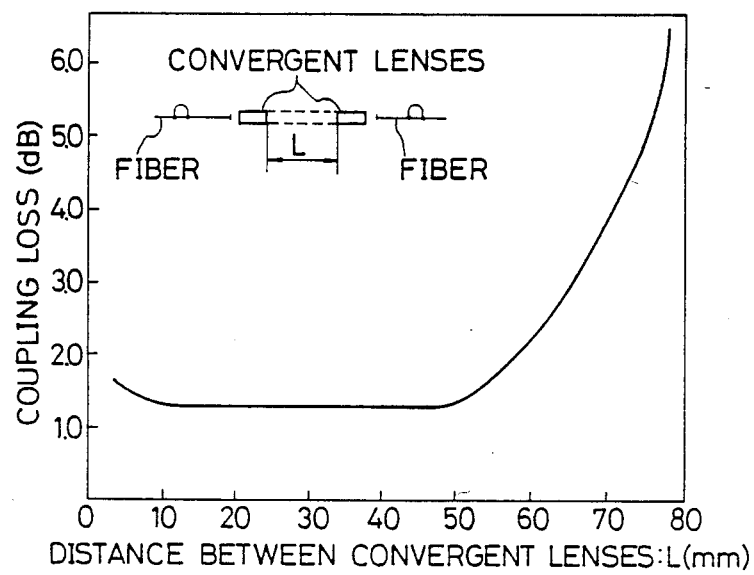
FIG. 3 is a view illustrating a relationship between convergent lenses distance and coupling loss.

In the case where the optical fibers have four ports as illustrated in FIG. 4, the mounting pitch between two adjacent plugs 20 is 16 mm when consideration is given to space for insertion and removal of the plugs 20, etc. Also, the aperture $S_3$ of the trapezoid prism 3 is given as twelve mm when the rhomboid prism 30, five mm square, is employed, and the length $l_3$ ($l=4.23\times S$) is given as 50.8 mm when the angle of deflection of the prism is fourty-five degrees. The optical path in the rhomboid prisms 30 and 31 being added to $l_3$, the distance between the convergent lenses 9 and 10 becomes sixty-eight mm. Thus, coupling loss is 3.3 dB according to FIG. 3, which is about half compared with the situation of FIG. 1 where the entrance and exit side optical fibers are directly connected with the trapezoid prism through the optical connector (in the case of four ports, the coupling loss is between 6 and 7 dB when l=84 mm). Additionally, in the case of a six-port optical fiber, the distance between the optical connectors becomes twenty-two mm with the aperture $S_3$ of the trapezoid prism being thirteen mm. This length being added to the optical path length of the rhomboid prism, the distance L between the convergent lenses of FIG. 3 becomes seventy mm with the coupling loss being 4.0 dB. When the intermediate optical fibers 8 and 11 of FIG. 2 are employed, the aperture S of the trapezoid prism becomes thirteen mm in a six-port case. Although the coupling loss in this case is as small as 2.0 dB, there is another coupling loss of two dB at the entrance and exit ends of the intermediate optical fibers 8 and 11 8 (optical connector coupling loss is generally one dB/one connection). This brings about an insertion loss of four dB in total, the same as in the rhomboid prism of FIG. 4. However, since the total length $L_1$ of the rotary joint of FIG. 2 becomes three times as long as the length $\theta_2$ of the trapezoid prism 3 if the intermediate optical fibers length of from sixty to eighty mm (a value when an optimum offset is taken into consideration in view of the assurance of the workability upon fabrication of the fiber) is added thereto. Thus, a system using the intermediate optical fibers is disadvantageous compared with the present invention, namely a system using reflection of the light, from the viewpoint of the cost and the handling properties thereof.

The intermediate gear 24 of the speed change mechanism 22 is divided into two gears, two gears having close contact with each, and those divided gears are biassed by a spring, or the like, so as to relatively produce rotational displacement. The intermediate gear 25 is constructed in the same fashion as gear 24. This causes the engagement surfaces of the gears 24 and 25 to be always in contact with the engagement surfaces of the gears 23 and 26, preventing any backlash. Accordingly, mismatching of the optical axes of the entrance and exit side optical fibers can be prevented when the rotator 2 is rotated normally and reversely, thus improving the performance of optical transmission. Although in the embodiment described above the speed change gear mechanism 22 is constructed by a combination of spur gears, a planetary gear mechanism shown in FIG. 1 may be employed for making the device more compact.

Several other embodiments of this invention will be now described.

Figure 5:
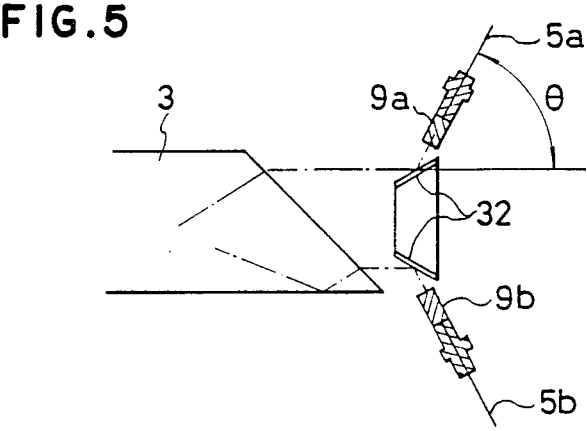
FIGS. 5 through 7 are sectional views illustrating another embodiment of a reflector of the multi-port fiberoptic rotary joint of the present invention respectively.

FIG. 5 illustrates another embodiment wherein a mirror 32 as the reflector is disposed between the trapezoid prism 3 and the emission optical fiber 5. The optical fiber 5 and the convergent lens 9 are arranged at the angle θ (ranging from zero to ninty degrees) with respect to the optical axis of the trapezoid prism 3, and the light from the convergent lens 9 is reflected in a direction parallel to the optical axis of the trapezoid prism 3. Another mirror (not shown) is likewise provided on the side of the exit surface 3c of the trapezoid prism 3. Such use of the mirror 32 assures the installation of a considerable number of optical fibers 5 even if the aperture S of the trapezoid prism 3 is small, while shortening the distance between the convergent lenses 9 and 10 accompanying a reduction of the coupling loss.

Figure 6:
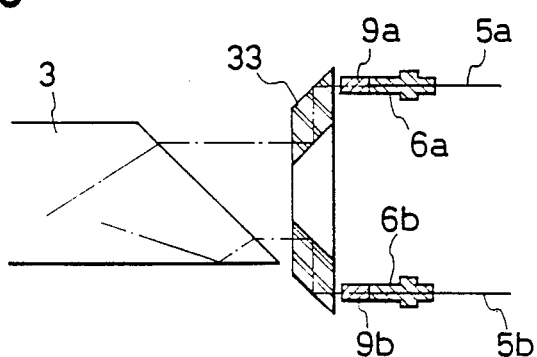

FIG. 6 illustrates a device employing two truncated conical prisms, one for each side, instead of plural rhomboid prisms of FIG. 4 between the trapezoid rism 3 and the entrance and exit side optical fibers 5, 14. While in FIG. 4, one rhomboid prism 30, 31 is installed to one optical fiber, only one prism 33 is installed in FIG. 6 irrespective to the number of the optical fibers. This results in easy adjustment of the optical axis as well as reduction of the number of parts and the cost.

Figure 7:
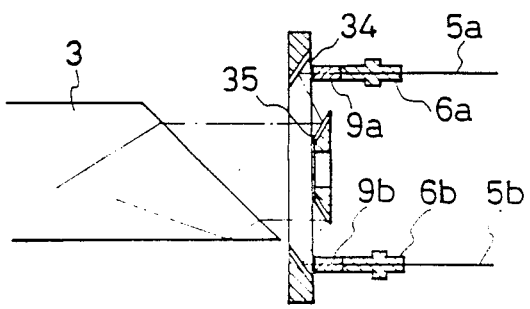

FIG. 7 illustrates still another modification of the embodiment wherein mirrors 34, 35 having conical reflecting surfaces are disposed on different levels between the optical fiber 5 and the trapezoid prism 3. Light from the optical fiber 5 is collimated through the convergent lens 9, and the resulting bundle of rays is reflected inward by the first-stage mirror 34 and made parallel to the optical axis of the trapezoid prism 3 by the second-stage mirror 35. Hereby, it is made possible to bring the convergent lens 9 close to the trapezoid prism, which can reduce the total length $L_2$ of the rotary joint.

Figure 8:
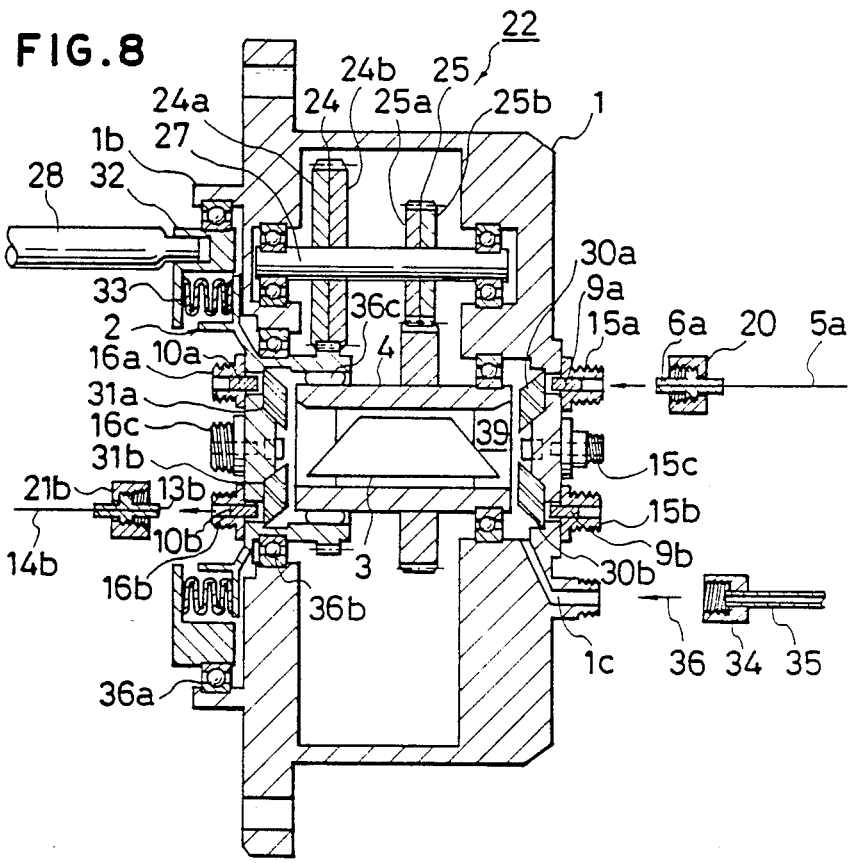
FIG. 8 is a longitudinal cross-sectional view illustrating another embodiment of the multi-port fiberoptic rotary joint of the present invention.
Figure 9A:
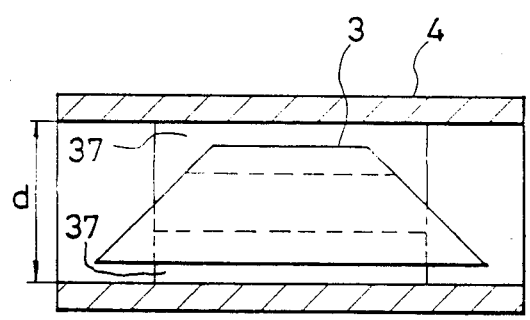
FIGS. 9A and 9B are enlarged views in part of FIG. 8 respectively.
Figure 9B:
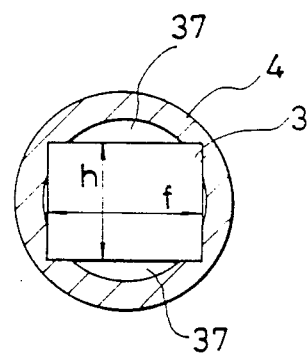

FIG. 8 illustrates a multi-port fiberoptic rotary joint of FIG. 4 further including dewing prevention means. The fixed member 1 has a through hole 1c bored in a wall thereof near the receptacle 15b. One end of the through hole 1c reaches space 39 between the trapezoid prism 3 and the rhomboid prism 30 while the other end thereof reaches the outer surface of the fixed member 1. A pipe 35 is connected to said the other end of the through hole 1c. The space 39 formed between the trapezoid prism 30 is filled with dry gas (not shown) supplied through the through hole 1c as indicated by the arrow 36. The prism holder 4 of FIG. 8 is hollow and cylinder-shaped, as illustrated in FIGS. 9A and 9B, with its inner diameter d larger than the height h and width f of the rectangle-shaped, in cross section, trapezoid prism 3. This is to form an air gap 37 between the trapezoid prism 3 and the prism holder 4. The dry gas fed through the through-hole 1c reaches the air gap 37, with which gas surfaces of the trapezoid prism 3 and the rhomboid prism 30 are prevented from being subject to moisture condensation even when the external environment around the rotary joint satisfies the conditions for moisture condensation. Here, such dry gas may be supplied only when circumstances demand it. On the other hand, the dry gas may be supplied at all times, in which case, hydrodynamic resistance is produced owing to bearings 36c, 36d to make the space 39 slightly higher in pneumatic pressure than the atmosphere of space where the gears 24, 25 are disposed, thus preventing dust from entering the space 39 in which the traezoid prism 3 is installed. The prevention of dew formation in the optical joint is important from the viewpoint of each end surface of the prism subjected to moisture causing incident and emergent angles of light to be changed because of the presence of water which allows the optical coupling loss to increase. Meanwhile, heater means may be utilized to prevent such moisture condensation.

With reference to FIG. 8 again, another rotative member 32 is provided between the rotator 2 and the rod 28 while a flexible coupling 33 such for example as metal bellows is provided between rotative member 32 and the rotator 2. With this structure, abnormal drive force such as torsion and thrust force is absorbed by the flexible coupling 33 so as to prevent transmission thereof to the rotator 2 even if abnormal driving force is applied to the rod 28. That is, only the radial turning force is applied to the rotator 2. If such abnormal driving force is transmitted to the rotator 2, then undue force is applied to the bearings 36b, 36c which support the rotator 2 to distort the optical path increasing the coupling loss. This also shortens the longevity of the bearings 36b and 36c.

It is expected as a matter of course that the preferred embodiments selected to describe the present invention may be subjected to any number of various modifications or additions by those skilled in the art without departing the spirit and scope of the present invention. For example, the reflector 30a provided between the optical fiber 5a and the trapezoid prism 3 is not limited to the foregoing rhomboid prism and truncated conical mirror insofar as an alternative element therefor can properly guide the light from the optical fiber 5a to the trapezoid prism 3 and from the trapezoid prism 3 to the reflector 31a. Thus, the protection sought herein is intended to cover all the details claimed in the appended claims and those equivalent thereto.

What is claimed is:

1. A multi-port fiberoptic rotary joint of the type having a fixed member and a rotative member, comprising:
   a trapezoid prism having an aperture, an entrance side, an exit side and an optical axis, said prism being disposed between the rotative member and the fixed member of the rotary joint so as to be rotatable relative to said rotative member and co-axial with said rotative member;
   a speed change gear mechanism for transmitting the rotation of said rotative member to the trapezoid prism to rotate the trapezoid prism at an angular velocity half the angular velocity of said rotative member;

reflector means provided on the entrance side of the trapezoid prism so as to optically guide the light coming from a region outside the aperture of said trapezoid prism to the trapezoid prism such that the light is parallel to the axis of the trapezoid prism within the aperture thereof, and reflector means provided on the exit side of the trapezoid prism so as to optically guide the light emanating from the trapezoid prism to a region outside the aperture of said trapezoid prism;

a plurality of pairs of convergent lenses respectively provided on the rotative member and the fixed member, the convergent lenses of each pair optically facing the entrance and exit surfaces of the trapezoid prism via the reflector means and optically facing each other, the convergent lenses in each pair thereof being spaced apart a distance greater than the width of the aperture of said trapezoid prism; and entrance and exit side optical fibers respectively connected to the entrance and exit surface side convergent lenses.

2. A multi-port fiberoptic rotary joint of claim 1, wherein said reflector means is a rhomboid prism formed to provide an angle of deflection of 90 degrees only twice to the light incident thereupon, one reflector means being provided for each optical fiber.

3. A multi-port fiberoptic rotary joint of claim 1, wherein said reflector means is a truncated conical mirror formed to reflect the light incident thereupon only once, said reflector means being two in total number, one reflector means being provided for all the entrance said optical fibers, the other reflector means being provided for all the exit side optical fibers.

4. A multi-port fiberoptic rotary joint of claim 1, wherein said reflector means is a truncated conical mirror formed to reflect the light incident thereupon only once, the reflector means being four in total number, two of said reflector means being provided for all the entrance optical fibers, the remaining two of said reflector means being provided for all the exit optical fibers.

5. A multi-port fiberoptic rotary joint of claim 1, further including a rotative element positioned between said rotative member and a member for transmitting turning force to the rotative member, said rotative element being rotated together with said member and rotatable with respect to said rotative member, and a flexible coupling for connecting said rotative element with the rotative member.

6. A multi-port fiberoptic rotary joint of claim 1, including a holder for supporting said trapezoid prism so as to be rotatable relative to said rotative member and said fixed member.

7. A multi-port fiberoptic rotary joint of claim 1, wherein said speed change gear mechanism includes a first gear disposed at the outer periphery of the rotative member, a shaft supported rotatably in said fixed member, a second gear disposed on said shaft for engagement with said first gear, a third gear provided at the outer periphery of said holder, and a fourth gear disposed on said shaft for engagement with said third gear.

8. A multi-port fiberoptic rotary joint of claim 1, wherein a gap is provided between the surface of the trapezoid prism and the inner peripheral wall of the holder upon housing of the trapezoid prism in the holder.

9. A multi-port fiberoptic joint of claim 1, wherein a passage is provided in said fixed member, the passage communicating with a space between the entrance surface of the trapezoid prism and the reflector means disposed on said entrance surface side, so that said gap and said space may be supplied with gas whose temperature is above a predetermined value when external temperature is under another predetermined value.

10. A multi-port fiberoptic rotary joint of claim 1, wherein said second gear is divided into a first set of two gears, and a first resilient member is provided between said first set of two gears so as to produce rotational displacement between said two gears, and said fourth gear is divided into a second set of two gears, and a second resilient member is provided between said second set of two gears so as to produce rotational displacement between said second set of two gears.

11. A multi-port fiberoptic rotary joint of claim 2, further including a rotative element positioned between said rotative member and a member for transmitting turning force to the rotative member, said rotative element being rotated together with said member and rotatable with respect to said rotative member, and a flexible coupling for connecting said rotative element with the rotative member.

12. A multi-port fiberoptic rotary joint of claim 3, further including a rotative element positioned between said rotative member and a member for transmitting turning force to the rotative member, said rotative element being rotated together with said member and rotatable with respect to said rotative member, and a flexible coupling for connecting said rotative element with the rotative member.

13. A multi-port fiberoptic rotary joint of claim 4, further including a rotative element positioned between said rotative member and a member for transmitting turning force to the rotative member, said rotative element being rotated together with said member and rotatable with respect to said rotative member, and a flexible coupling for connecting said rotative element with the rotative member.

14. A multi-port fiberoptic rotary joint of claim 2, including a holder for supporting said trapezoid prism so as to be rotatable relative to said rotative member and said fixed member.

15. A multi-port fiberoptic rotary joint of claim 3, including a holder for supporting said trapezoid prism so as to be rotatable relative to said rotative member and said fixed member.

16. A multi-port fiberoptic rotary joint of claim 4, including a holder for supporting said trapezoid prism so as to be rotatable relative to said rotative member and said fixed member.

17. A multi-port fiberoptic rotary joint of claim 5, including a holder for supporting said trapezoid prism so as to be rotatable relative to said rotative member and said fixed member.

18. A multi-port fiberoptic rotary joint of claim 2, wherein said speed change gear mechanism includes a first gear disposed at the outer periphery of the rotative member, a shaft supported rotatably in said fixed member, a second gear disposed on said shaft for engagement with said first gear, a third gear provided at the outer periphery of said holder, and a fourth gear disposed on said shaft for engagement with said third gear.

19. A multi-port fiberoptic rotary joint of claim 3, wherein said speed change gear mechanism includes a first gear disposed at the outer periphery of the rotative member, a shaft supported rotatably in said fixed member, a second gear disposed on said shaft for engagement with said first gear, a third gear provided at the outer periphery of said holder, and a fourth gear disposed on said shaft for engagement with said third gear.

20. A multi-port fiberoptic rotary joint of claim 4, wherein said speed change gear mechanism includes a first gear disposed at the outer periphery of the rotative member, a shaft supported rotatably in said fixed member, a second gear disposed on said shaft for engagement with said first gear, a third gear provided at the outer periphery of said holder, and a fourth gear disposed on said shaft for engagement with said third gear.

21. A multi-port fiberoptic rotary joint of claim 5, wherein said speed change gear mechanism includes a first gear disposed at the outer periphery of the rotative member, a shaft supported rotatably in said fixed member, a second gear disposed on said shaft for engagement with said first gear, a third gear provided at the outer periphery of said holder, and a fourth gear disposed on said shaft for engagement with said third gear.

22. A multi-port fiberoptic rotary joint of claim 6, wherein said speed change gear mechanism includes a first gear disposed at the outer periphery of the rotative member, a shaft supported rotatably in said fixed member, a second gear disposed on said shaft for engagement with said first gear, a third gear provided at the outer periphery of said holder, and a fourth gear disposed on said shaft for engagement with said third gear.

23. A multi-port fiberoptic rotary joint of claim 2, wherein a gap is provided between the surface of the trapezoid prism and the inner peripheral wall of the holder upon housing of the trapezoid prism in the holder.

24. A multi-port fiberoptic rotary joint of claim 3, wherein a gap is provided between the surface of the trapezoid prism and the inner peripheral wall of the holder upon housing of the trapezoid prism in the holder.

25. A multi-port fiberoptic rotary joint of claim 4, wherein a gap is provided between the surface of the trapezoid prism and the inner peripheral wall of the holder upon housing of the trapezoid prism in the holder.

26. A multi-port fiberoptic rotary joint of claim 5, wherein a gap is provided between the surface of the trapezoid prism and the inner peripheral wall of the holder upon housing of the trapezoid prism in the holder.

27. A multi-port fiberoptic rotary joint of claim 6, wherein a gap is provided between the surface of the trapezoid prism and the inner peripheral wall of the holder upon housing of the trapezoid prism in the holder.

28. A multi-port fiberoptic rotary joint of claim 7, wherein a gap is provided between the surface of the trapezoid prism and the inner peripheral wall of the holder upon housing of the trapezoid prism in the holder.

29. A multi-port fiberoptic joint of claim 2, wherein a passage is provided in said fixed member, the passage communicating with a space between the entrance surface of the trapezoid prism and the reflector means disposed on said entrance surface side, so that said gap and said space may be supplied with gas whose temperature is above a predetermined value when external temperature is under another predetermined value.

30. A multi-port fiberoptic joint of claim 3, wherein a passage is provided in said fixed member, the passage communicating with a space between the entrance surface of the trapezoid prism and the reflector means disposed on said entrance surface side, so that said gap and said space may be supplied with gas whose temperature is above a predetermined value when external temperature is under another predetermined value.

31. A multi-port fiberoptic joint of claim 4, wherein a passage is provided in said fixed member, the passage communicating with a space between the entrance surface of the trapezoid prism and the reflector means disposed on said entrance surface side, so that said gap and said space may be supplied with gas whose temperature is above a predetermined value when external temperature is under another predetermined value.

32. A multi-port fiberoptic joint of claim 5, wherein a passage is provided in said fixed member, the passage communicating with a space between the entrance surface of the trapezoid prism and the reflector means disposed on said entrance surface side, so that said gap and said space may be supplied with gas whose temperature is above a predetermined value when external temperature is under another predetermined value.

33. A multi-port fiberoptic joint of claim 6, wherein a passage is provided in said fixed member, the passage communicating with a space between the entrance surface of the trapezoid prism and the reflector means disposed on said entrance surface side, so that said gap and said space may be supplied with gas whose temperature is above a predetermined value when external temperature is under another predetermined value.

34. A multi-port fiberoptic joint of claim 7, wherein a passage is provided in said fixed member, the passage communicating with a space between the entrance surface of the trapezoid prism and the reflector means disposed on said entrance surface side, so that said gap and said space may be supplied with gas whose temperature is above a predetermined value when external temperature is under another predetermined value.

35. A multi-port fiberoptic joint of claim 8, wherein a passage is provided in said fixed member, the passage communicating with a space between the entrance surface of the trapezoid prism and the reflector means disposed on said entrance surface side, so that said gap and said space may be supplied with gas whose temperature is above a predetermined value when external temperature is under another predetermined value.

36. A multi-port fiberoptic rotary joint of claim 2, wherein said second gear is divided into a first set of two gears, and a first resilient member is provided between said first set of two gears so as to produce rotational displacement between said two gears, and said fourth gear is divided into a second set of two gears, and a second resilient member is provided between said second set of two gears so as to produce rotational displacement between said second set of two gears.

37. A multi-port fiberoptic rotary joint of claim 3, wherein said second gear is divided into a first set of two gears, and a first resilient member is provided between said first set of two gears so as to produce rotational displacement between said two gears, and said fourth gear is divided into a second set of two gears, and a second resilient member is provided between said second set of two gears so as to produce rotational displacement between said second set of two gears.

38. A multi-port fiberoptic rotary joint of claim 4, wherein said second gear is divided into a first set of two gears, and a first resilient member is provided between said first set of two gears so as to produce rotational displacement between said two gears, and said fourth gear is divided into a second set of two gears, and a second resilient member is provided between said second set of two gears so as to produce rotational displacement between said second set of two gears.

39. A multi-port fiberoptic rotary joint of claim 5, wherein said second gear is divided into a first set of two gears, and a first resilient member is provided between said first set of two gears so as to produce rotational displacement between said two gears, and said fourth gear is divided into a second set of two gears, and a second resilient member is provided between said second set of two gears so as to produce rotational displacement between said second set of two gears.

40. A multi-port fiberoptic rotary joint of claim 6, wherein said second gear is divided into a first set of two gears, and a first resilient member is provided between said first set of two gears so as to produce rotational displacement between said two gears, and said fourth gear is divided into a second set of two gears, and a second resilient member is provided between said second set of two gears so as to produce rotational displacement between said second set of two gears.

41. A multi-port fiberoptic rotary joint of claim 7, wherein said second gear is divided into a first set of two gears, and a first resilient member is provided between said first set of two gears so as to produce rotational displacement between said two gears, and said fourth gear is divided into a second set of two gears, and a second resilient member is provided between said second set of two gears so as to produce rotational displacement between said second set of two gears.

42. A multi-port fiberoptic rotary joint of claim 8, wherein said second gear is divided into a first set of two gears, and a first resilient member is provided between said first set of two gears so as to produce rotational displacement between said two gears, and said fourth gear is divided into a second set of two gears, and a second resilient member is provided between said second set of two gears so as to produce rotational displacement between said second set of two gears.

43. A multi-port fiberoptic rotary joint of claim 9, wherein said second gear is divided into a first set of two gears, and a first resilient member is provided between said first set of two gears so as to produce rotational displacement between said two gears, and said fourth gear is divided into a second set of two gears, and a second resilient member is provided between said second set of two gears so as to produce rotational displacement between said second set of two gears.

44. A multi-port fiberoptic rotary joint of the type having a fixed member and a rotative member, comprising:
  a trapezoid prism having an aperture, an entrance side, an exit side and an optical axis, said prism being disposed between the rotative member and the fixed member of the rotary joint so as to be rotatable relative to said rotative member and coaxial with said rotative member;
  a speed change gear mechanism for transmitting the rotation of said rotative member to the trapezoid prism to rotate the trapezoid prism at an angular velocity half the angular velocity of said rotative member;
  reflector means provided on the entrance side of the trapezoid prism so as to optically guide the light coming from a region outside the aperture of said trapezoid prism to the trapezoid prism such that the light is parallel to the axis of the trapezoid prism within the aperture thereof, and reflector means provided on the exit side of the trapezoid prism so as to optically guide the light emanating from the trapezoid prism so as to optically guide the light emanating from the trapezoid prism to a region outside the aperture of said trapezoid prism, said reflector means including a truncated conical mirror formed to reflect the light incident thereupon only once, said reflector means being two in total number, one reflector means being provided for all the entrance optical fibers, the other reflector means being provided for all of the exit optical fibers;
  a plurality of pairs of convergent lenses respectively provided on the rotative member and the fixed member, the convergent lenses of each pair optically facing the entrance and exit surfaces of the trapezoid prism via the reflector means and optically facing each other; and
  entrance and exit side optical fibers respectively connected to the entrance and exit surface side convergent lenses.

45. A multi-port fiberoptic rotary joint of the type having a fixed member and a rotative member, comprising:
  a trapezoid prism having an aperture, an entrance side, an exit side and an optical axis, said prism being disposed between the rotative member and the fixed member of the rotary joint so as to be rotatable relative to said rotative member and coaxial with said rotative member;
  a speed change gear mechanism for transmitting the rotation of said rotative member to the trapezoid prism to rotate the trapezoid prism at an angular velocity half the angular velocity of said rotative member;
  reflector means provided on the entrance side of the trapezoid prism so as to optically guide the light coming from a region outside the aperture of said trapezoid prism to the trapezoid prism such that the light is parallel to the axis of the trapezoid prism within the aperture thereof, and reflector means provided on the exit side of the trapezoid prism so as to optically guide the light emanating from the trapezoid prism so as to optically guide the light emanating from the trapezoid prism to a region outside the aperture of said trapezoid prism, said reflector means including a truncated conical mirror formed to reflect the light incident thereupon only once, the reflector means being four in total number, two of said reflector means being provided for all of the entrance optical fibers, the remaining two of said reflector means being provided for all of the exit optical fibers;
  a plurality of pairs of convergent lenses respectively provided on the rotative member and the fixed member, the convergent lenses of each pair optically facing the entrance and exit surfaces of the trapezoid prism via the reflector means and optically facing each other; and
  entrance and exit side optical fibers respectively connected to the entrance and exit surface side convergent lenses.

46. A multi-port fiberoptic rotary joint of the type having a fixed member and a rotative member, comprising:
- a trapezoid prism having an aperture, an entrance side, an exit side and an optical axis, said prism being disposed between the rotative member and the fixed member of the rotary joint so as to be rotatable relative to said rotative member and coaxial with said rotative member;
- a speed change gear mechanism for transmitting the rotation of said rotative member to the trapezoid prism to rotate the trapezoid prism at an angular velocity half the angular velocity of said rotative member;
- reflector means provided on the entrance side of the trapezoid prism so as to optically guide the light coming from a region outside the aperture of said trapezoid prism to the trapezoid prism such that the light is parallel to the axis of the trapezoid prism within the aperture thereof, and reflector means provided on the exit side of the trapezoid prism so as to optically guide the light emanating from the trapezoid prism to a region outside the aperture of said trapezoid prism;
- a plurality of pairs of convergent lenses respectively provided on the rotative member and the fixed member, the convergent lenses of each pair optically facing the entrance and exit surfaces of the trapezoid prism via the reflector means and optically facing each other;
- entrance and exit side optical fibers respectively connected to the entrance and exit surface side convergent lenses; and,
- a rotative element positioned between said rotative member and a member for transmitting turning force to the rotative member, said rotative element being rotated together with said member and rotatable with respect to said rotative member, and a flexible coupling for connecting said rotative element with the rotative member.

47. A multi-port fiberoptic rotary joint of the type having a fixed member and a rotative member, comprising:
- a trapezoid prism having an aperture, an entrance side, an exit side and an optical axis, said prism being disposed between the rotative member and the fixed member of the rotary joint so as to be rotatable relative to said rotative member and coaxial with said rotative member;
- a speed change gear mechanism for transmitting the rotation of said rotative member to the trapezoid prism to rotate the trapezoid prism at an angular velocity half the angular velocity of said rotative member, said speed change gear mechanism including a first gear disposed at the outer periphery of the rotative member, a shaft rotatably supported in said fixed member, a second gear disposed on said shaft for engagement with said first gear, a third gear provided at the outer periphery of said holder, and a fourth gear disposed on said shaft for engagement with said third gear;
- reflector means provided on the entrance side of the trapezoid prism so as to optically guide the light coming from a region outside the aperture of said trapezoid prism to the trapezoid prism such that the light is parallel to the axis of the trapezoid prism within the aperture thereof, and reflector means provided on the exit side of the trapezoid prism so as to optically guide the light emanating from the trapezoid prism to a region outside the aperture of said trapezoid prism;
- a plurality of pairs of convergent lenses respectively provided on the rotative member and the fixed member, the convergent lenses of each pair optically facing the entrance and exit surfaces of the trapezoid prism via the reflector means and optically facing each other; and
- entrance and exit side optical fibers respectively connected to the entrance and exit surface side convergent lenses.

48. A multi-port fiberoptic rotary joint of the type having a fixed member and a rotative member, comprising:
- a trapezoid prism having an aperture, an entrance side, an exit side and an optical axis, said prism being disposed between the rotative member and the fixed member of the rotary joint so as to be rotatable relative to said rotative member and coaxial with said rotative member;
- a speed change gear mechanism for transmitting the rotation of said rotative member to the trapezoid prism to rotate the trapezoid prism at an angular velocity half the angular velocity of said rotative member;
- reflector means provided on the entrance side of the trapezoid prism so as to optically guide the light coming from a region outside the aperture of said trapezoid prism to the trapezoid prism such that the light is parallel to the axis of the trapezoid prism within the aperture thereof, and reflector means provided on the exit side of the trapezoid prism so as to optically guide the light emanating from the trapezoid prism to a region outside the aperture of said trapezoid prism;
- a plurality of pairs of convergent lenses respectively provided on the rotative member and the fixed member, the convergent lenses of each pair optically facing the entrance and exit surfaces of the trapezoid prism via the reflector means and optically facing each other; and
- entrance and exit side optical fibers respectively connected to the entrance and exit surface side convergent lenses,
- there being provided a passage in said fixed member, the passage communicating with a space between the entrance surface of the trapezoid prism and the reflector means disposed on said entrance surface side, so that said gap and said space may be supplied with gas whose temperature is above a predetermined value when the external temperature is under another predetermined value.

49. A multi-port fiberoptic rotary joint of the type having a fixed member and a rotative member, comprising:
- a trapezoid prism having an aperture, an entrance side, an exit side and an optical axis, said prism being disposed between the rotative member and the fixed member of the rotary joint so as to be rotatable relative to said rotative member and coaxial with said rotative member;
- a speed change gear mechanism for transmitting the rotation of said rotative member to the trapezoid prism to rotate the trapezoid prism at an angular velocity half the angular velocity of said rotative member, said speed change gear mechanism including a first gear disposed at the outer periphery of the rotative member, a shaft rotatably supported in said fixed member, a second gear disposed on said shaft for engagement with said first gear, a third gear provided at the outer periphery of said holder, and a fourth gear disposed on said shaft for engagement with said third gear, said second gear being divided into a first set of two gears, there being further provided a first resilient member between said first set of two gears so as to produce rotational displacement between said two gears, and said fourth gear being divided into a second set of two gears, there being further provided a second resilient member between said second set of two gears so as to produce rotational displacement between said second set of two gears;

reflector means provided on the entrance side of the trapezoid prism so as to optically guide the light coming from a region outside the aperture of said trapezoid prism to the trapezoid prism such that the light is parallel to the axis of the trapezoid prism within the aperture thereof, and reflector means provided on the exit side of the trapezoid prism so as to optically guide the light emanating from the trapezoid prism so as to optically guide the light emanating from the trapezoid prism to a region outside the aperture of said trapezoid prism;

a plurality of pairs of convergent lenses respectively provided on the rotative member and the fixed member, the convergent lenses of each pair optically facing the entrance and exit surfaces of the trapezoid prism via the reflector means and optically facing each other; and entrance and exit side optical fibers respectively connected to the entrance and exit surface side convergent lenses.

50. A multi-port fiberoptic rotary joint of the type having a fixed member and a rotative member, comprising:

a trapezoid prism having an aperture, an entrance side, an exit side and an optical axis, said prism being disposed between the rotative member and the fixed member of the rotary joint so as to be rotatable relative to said rotative member and coaxial with said rotative member;

a speed change gear mechanism for transmitting the rotation of said rotative member to the trapezoid prism to rotate the trapezoid prism at an angular velocity half the angular velocity of said rotative member, said speed change gear mechanism including a first gear disposed at the outer periphery of the rotative member, a shaft rotatably supported in said fixed member, a second gear disposed on said shaft for engagement with said first gear, a third gear provided at the outer periphery of said holder, and a fourth gear disposed on said shaft for engagement with said third gear;

reflector means provided on the entrance side of the trapezoid prism so as to optically guide the light coming from a region outside the aperture of said trapezoid prism to the trapezoid prism such that the light is parallel to the axis of the trapezoid prism within the aperture thereof, and reflector means provided on the exit side of the trapezoid prism so as to optically guide the light emanating from the trapezoid prism so as to optically guide the light emanating from the trapezoid prism to a region outside the aperture of said trapezoid prism, said reflector means including a rhomboid prism formed to provide an angle of deflection of 90 degrees only twice to the light incident thereupon, one reflector means being provided for each optical fiber;

a plurality of pairs of convergent lenses respectively provided on the rotative member and the fixed member, the convergent lenses of each pair optically facing the entrance and exit surfaces of the trapezoid prism via the reflector means and optically facing each other; and entrance and exit side optical fibers respectively connected to the entrance and exit surface side convergent lenses.

* * * * *

UNITED STATES PATENT AND TRADEMARK OFFICE
CERTIFICATE OF CORRECTION

PATENT NO. : 4,872,737

DATED : October 10, 1989

INVENTOR(S) : Toshio Fukahori; Hideyuki Takashima; and Hitoshi Morinaga

It is certified that error appears in the above-identified patent and that said Letters Patent is hereby corrected as shown below:

Claim 44, column 14, lines 7 and 8, delete "so as to optically guide the light emanating from the trapezoid prism".

Claim 45, column 14, lines 48 and 49, delete "so as to optically guide the light emanating from the trapezoid prism".

Signed and Sealed this

Twenty-sixth Day of February, 1991

*Attest:*

HARRY F. MANBECK, JR.

*Attesting Officer*     *Commissioner of Patents and Trademarks*

UNITED STATES PATENT AND TRADEMARK OFFICE
CERTIFICATE OF CORRECTION

PATENT NO. : 4,872,737

DATED : October 10, 1989

INVENTOR(S) : Toshio Fukahori, Hideyuki Takashima, and Hitoshi Morinaga

It is certified that error appears in the above-identified patent and that said Letters Patent is hereby corrected as shown below:

Column 17, lines 24 and 25, delete "so as to optically guide the light emanating from the trapezoid prism".

Column 18, lines 24 and 25, delete "so as to optically guide the light emanating from the trapezoid prism".

Signed and Sealed this

Eighth Day of December, 1992

Attest:

DOUGLAS B. COMER

*Attesting Officer*      *Acting Commissioner of Patents and Trademarks*